US011077477B2

(12) United States Patent
Zeng et al.

(10) Patent No.: US 11,077,477 B2
(45) Date of Patent: Aug. 3, 2021

(54) INCREMENTAL ROTARY ROLLING MILL AND METHOD

(71) Applicant: Northwestern University, Evanston, IL (US)

(72) Inventors: Qiang Zeng, Evanston, IL (US);
Kornel Ehmann, Evanston, IL (US);
Man Kwan Ng, Evanston, IL (US);
Jian Cao, Wilmette, IL (US)

(73) Assignee: Northwestern University, Evanston, IL (US)

( * ) Notice: Subject to any disclaimer, the term of this patent is extended or adjusted under 35 U.S.C. 154(b) by 194 days.

(21) Appl. No.: 16/341,163

(22) PCT Filed: Oct. 6, 2017

(86) PCT No.: PCT/US2017/055615
§ 371 (c)(1),
(2) Date: Apr. 11, 2019

(87) PCT Pub. No.: WO2018/071306
PCT Pub. Date: Apr. 19, 2018

(65) Prior Publication Data
US 2020/0188974 A1    Jun. 18, 2020

Related U.S. Application Data

(60) Provisional application No. 62/406,669, filed on Oct. 11, 2016.

(51) Int. Cl.
*B21B 1/20*    (2006.01)
*B21B 37/46*    (2006.01)
(Continued)

(52) U.S. Cl.
CPC ............. *B21B 37/46* (2013.01); *B21B 1/20* (2013.01); *B21B 19/06* (2013.01); *B21B 35/06* (2013.01);
(Continued)

(58) Field of Classification Search
CPC .. B21B 1/20; B21B 1/42; B21B 13/00; B21B 13/008; B21B 17/02; B21B 17/14;
(Continued)

(56) References Cited

U.S. PATENT DOCUMENTS 1,978,220 A * 10/1934 Otte ..................... C21D 8/1222
148/108
1,993,427 A * 3/1935 Widuch .................. B21B 19/06
72/96
(Continued)

FOREIGN PATENT DOCUMENTS

DE        10030823 A1 *  1/2002  ............. B21B 13/00
JP        63-154206 A *  6/1988  ............. B21B 19/06
(Continued)

OTHER PUBLICATIONS

Translation, DE 10030823 A1, Schaefer et al., Jan. 2002.*
Dec. 26, 2017—(WO) International Search Report and Written Opinion—App PCT/US2017/055615.

*Primary Examiner* — Edward T Tolan
(74) *Attorney, Agent, or Firm* — Banner & Witcoff, Ltd.

(57) ABSTRACT

A rolling mill system for Incremental rotary shaping of an elongated workpiece is provided that includes first and second workpiece holders. A support frame has a track with the first and second workpiece holders being movably associated with the track, the workpiece holders and an associated workpiece being movable in unison along the track. A radial chuck is mounted to the frame that includes a plurality of jaws that are movable radially inwardly and outwardly. Each jaw has a tool mounted thereto that is
(Continued)

rotatable about an axis of rotation, with the axis of rotation of each tool being oriented at a skew angle relative to the longitudinal axis of a workpiece. A source of electric current and an electrically conductive flow path are provided for flowing electrical current through a workpiece. A controller is provided that is configured to control the operation of each of the first motor, second motor and third motor, and to control the flow of current flowing through the tools to the workpiece.

20 Claims, 8 Drawing Sheets

(51) Int. Cl.
    *B21B 19/06*          (2006.01)
    *B21B 35/06*          (2006.01)
    *B21B 39/02*          (2006.01)

(52) U.S. Cl.
    CPC .......... *B21B 39/02* (2013.01); *B21B 2203/26* (2013.01); *B21B 2267/06* (2013.01); *B21B 2275/04* (2013.01); *B21B 2275/10* (2013.01)

(58) Field of Classification Search
    CPC ......... B21B 19/02; B21B 19/04; B21B 19/06; B21B 27/025; B21B 27/106; B21B 37/46; B21B 37/74; B21B 39/02; B21B 39/06; B21B 39/165
    See application file for complete search history.

(56) References Cited

U.S. PATENT DOCUMENTS

| | | | | |
|---|---|---|---|---|
| 2,330,811 | A | * | 10/1943 | Darner .................. B21D 22/18 72/69 |
| 2,774,263 | A | | 12/1956 | Leufven |
| 3,228,220 | A | * | 1/1966 | Schneckenburger ... B21B 1/166 72/8.5 |
| 3,460,364 | A | * | 8/1969 | Kralowetz ................. B21J 9/08 72/7.3 |
| 3,695,076 | A | * | 10/1972 | Kocks ..................... B21B 19/06 72/97 |
| 3,988,913 | A | * | 11/1976 | Metcalfe ............... B21B 45/004 72/69 |
| 4,154,076 | A | * | 5/1979 | Tuschy .................... B21B 3/00 72/69 |
| 4,172,399 | A | | 10/1979 | Hillesheimer |
| 4,269,552 | A | | 5/1981 | Unigovsky et al. |
| 4,501,134 | A | * | 2/1985 | Staat ...................... B21B 19/00 72/11.4 |
| 5,515,705 | A | | 5/1996 | Weldon et al. |
| 5,744,773 | A | * | 4/1998 | Van Otteren ............ C21D 1/40 219/50 |
| 2002/0009950 | A1 | | 1/2002 | Mori et al. |

FOREIGN PATENT DOCUMENTS

| | | | | |
|---|---|---|---|---|
| JP | 5-329510 | A | * 12/1993 | ............... B21B 3/02 |
| SU | 531614 | A1 | * 10/1976 | ............. B21B 13/00 |

* cited by examiner

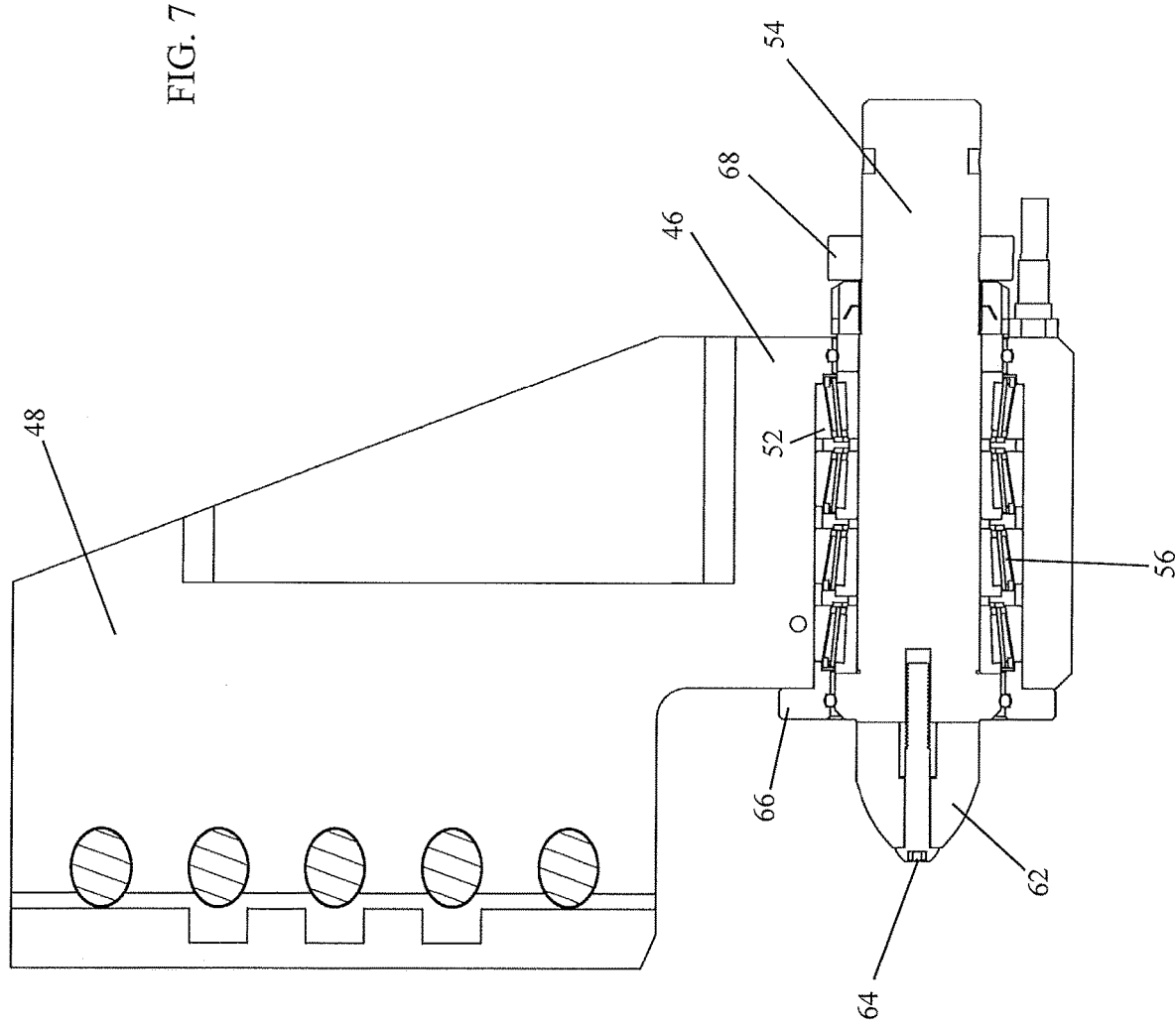

INCREMENTAL ROTARY ROLLING MILL AND METHOD

CROSS-REFERENCE TO RELATED APPLICATIONS

This application is a U.S. National Stage application under 35 U.S.C. § 371 of International Application PCT/US2017/055615 (published as WO 2018/071306 A1), filed Oct. 6, 2017 which claims the benefit of priority to U.S. Application Ser. No. 62/406,669, filed Oct. 11, 2016. Each of these prior applications are hereby incorporated by reference in their entirety.

This invention was made with governmental support under DE-NE0008409 awarded by the U.S. Department of Energy. The government has certain rights in the invention.

BACKGROUND OF THE INVENTION

The present application relates to a rolling mill for forming tubes and rods and, more particularly, to a rolling mill that provides for incremental reduction and shaping of a tubular or rod-shaped workpiece.

A rolling reduction/shaping mill is a device that reduces/shapes the cross section of a tube/rod by a rolling process. Reduction/shaping mills in common use are typically one of three different types, namely, a pilger mill (see, e.g., U.S. Pat. Nos. 4,386,512, 4,562,713, 4,037,444, and 4,184,352), a swaging mill (see, e.g., U.S. Pat. Nos. 771,611 and RE13,377), and a rotary rolling mill (see, e.g., U.S. Pat. Nos. 2,774,263 and 6,306,007).

The pilger mill uses two or three dies with tapered grove profiles to reduce/shape the tube/rod cross section. The rotary axes of the dies are perpendicular to the axis of the tube/rod resulting in a longitudinal rolling process. The swaging mill reduces/shapes the tube/rod size by squeezing motions of the dies. The moving direction of each die is designed along the radial direction of the tube/rod. Both the pilger and swaging mills are die-dependent rolling processes.

The rotary rolling mill includes three or four driven dies with a combined planetary rolling process. The rotary axes of the dies intersect the tube/rod axis at a given skew angle. However, the rolling size/shape is, constant, and not ac adjustable, since the relative radial positions of the dies with respect to the axis of the tube/rod is not changeable.

Each of the pilger, swaging and rotary rolling reduction/shaping mills described above provide for a die-dependent process, with little process controllability and limited accuracy. By way of the present application, a rolling mill is provided that provides for greater flexibility and accuracy in the shaping of tubular or rod-shaped bar stock.

SUMMARY

There are several aspects of the present subject matter that may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In a first aspect of the disclosure, a rolling mill system for incremental rotary shaping of an elongated workpiece is provided that includes a first workpiece holder configured to secure the first end of a workpiece thereto and a second workpiece holder configured to secure the second end of the workpiece thereto so that the longitudinal axis of the workpiece extends between the first and second workpiece holders. A support frame is provided having an input end and an output end and supporting a track, with the first and second workpiece holders being movably associated with the track. A first motor is mounted to the support frame and operatively connected to one of the first and second workpiece holders for moving the first and second workpiece holders and an associated ac workpiece in unison along the track between the input end and the output end of the support frame.

A radial chuck is mounted to the frame that includes a plurality of jaws that are movable radially inwardly and outwardly relative to the longitudinal axis of the workpiece. Each jaw has a tool mounted thereto rotatable about an axis of rotation, with the axis of rotation of each tool being oriented at a skew angle relative to the longitudinal axis of a workpiece. A second motor is associated with the chuck and is operatively connected to the jaws for simultaneously moving the jaws toward or away from the workpiece, and a third motor is operatively connected to each tool for simultaneously rotating each tool relative to its associated jaw.

A source of electric current and an electrically conductive flow path are provided for flowing electrical current through a workpiece. In one embodiment, the source of electric current and the electrically conductive flow path are connected to each of the tools and one of the workpiece holders. Alternatively, the source of electric current and the electrically conductive flow path are connected to the opposite ends of the workpiece.

A controller is provided that is configured to control the operation of each of the first motor, second motor and third motor, and to control the flow of current flowing through the workpiece.

In a second aspect of the disclosure, a method is provided for the incremental rotary shaping of an elongated workpiece with the system described above. The method comprises; a) mounting the workpiece to the first and second workpiece holders; b) moving the jaws of the chuck radially inwardly to bring the workpiece engaging surfaces of the tools into contact with the workpiece; c) ac rotating the tools; d) moving the workpiece relative to the tools in a forming pass from a first position to a second position; e) moving the jaws of the chuck radially outwardly to move the workpiece engaging surfaces of the tools away from contact with the workpiece; f) moving the workpiece relative to the tools in a return pass from the second position to the first position; and g) repeating steps b)-f), as needed, to achieve a desired shape for the workpiece. Preferably, electrical current is flowed through the workpiece as the workpiece moves in the forming pass.

BRIEF DESCRIPTION OF THE DRAWINGS

FIG. 7 is an enlarged cross-sectional view of a single jaw member and its associated forming tool.

DETAILED DESCRIPTION

Figure 1:
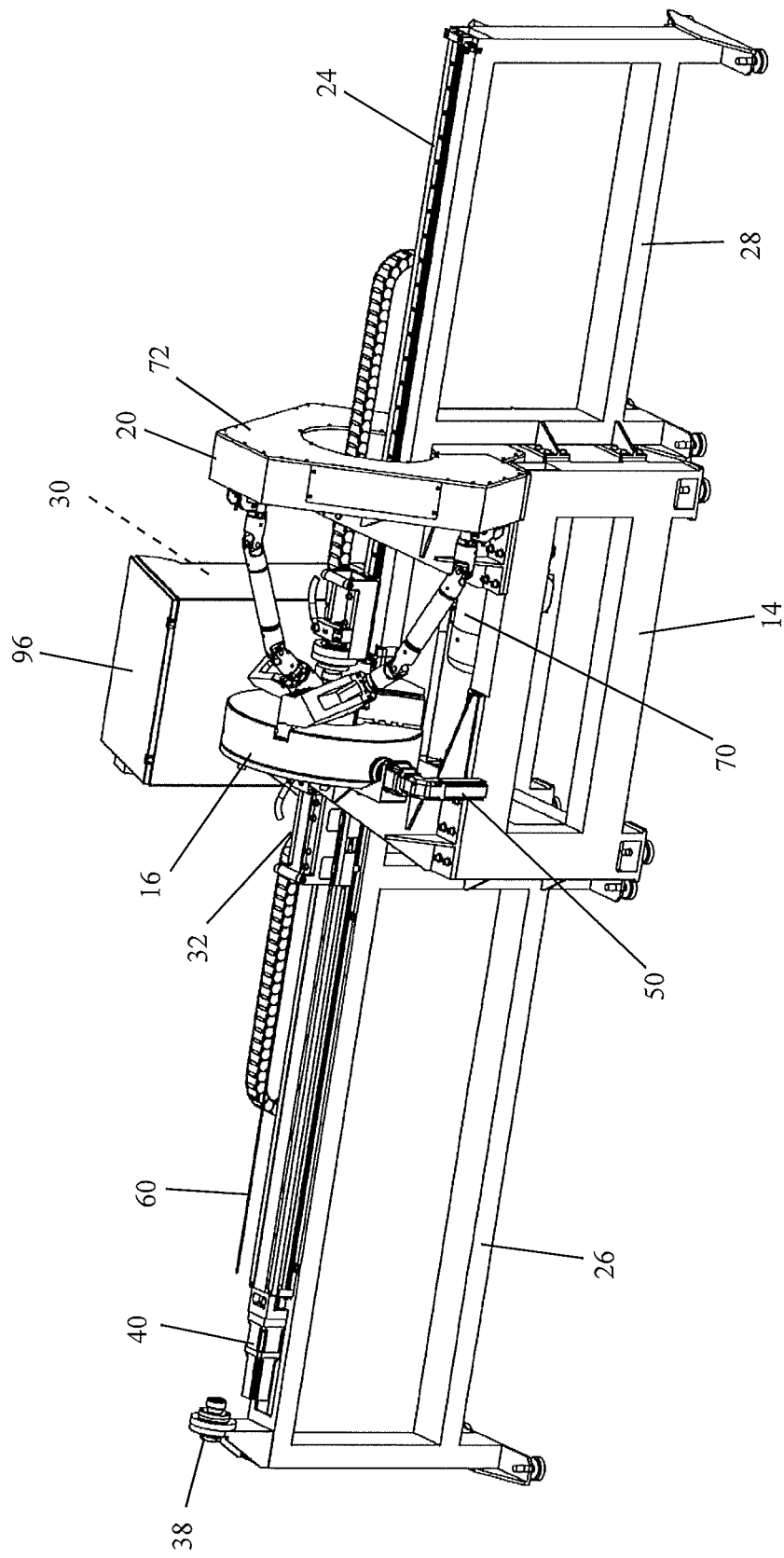
FIG. 1 is a perspective view of a rolling mill for the incremental forming of a tubular workpiece in accordance with the present disclosure.
Figure 2:
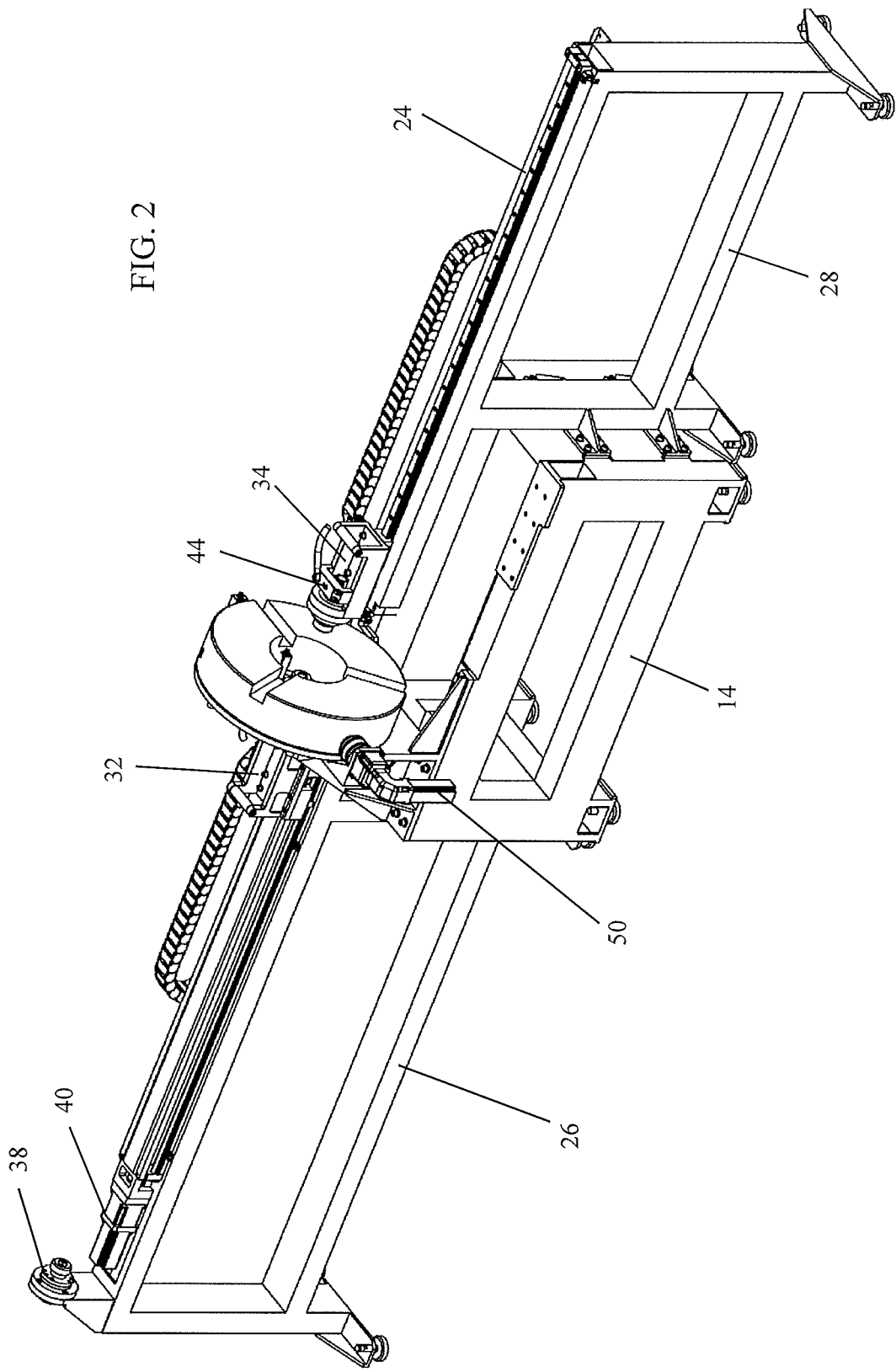
FIG. 2 is a perspective view similar to FIG. 1 with certain components of the system removed for clarity.
Figure 3:
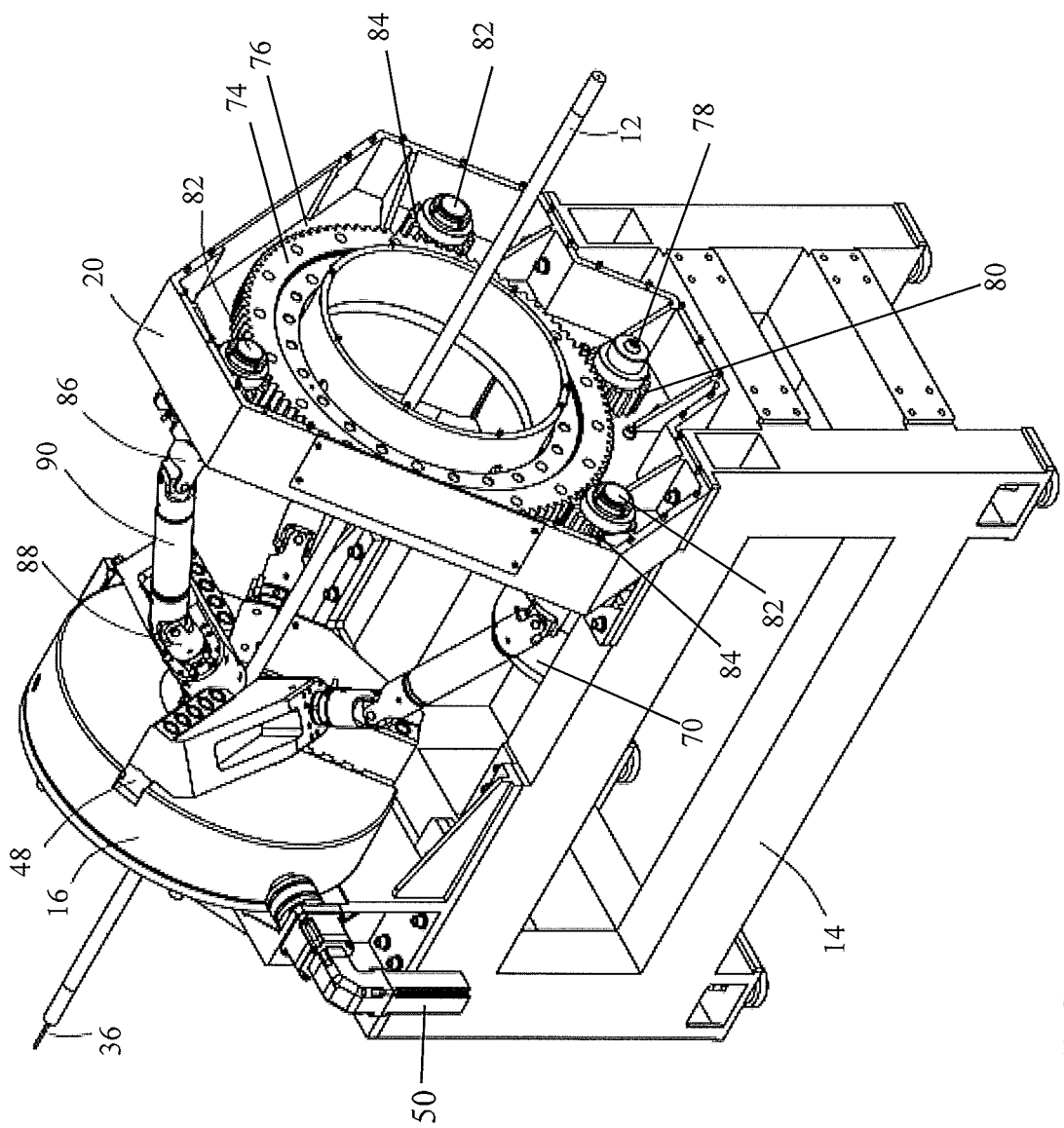
FIG. 3 is an enlarged perspective view of the central forming section of the system, with certain components removed for clarity.
Figure 4:
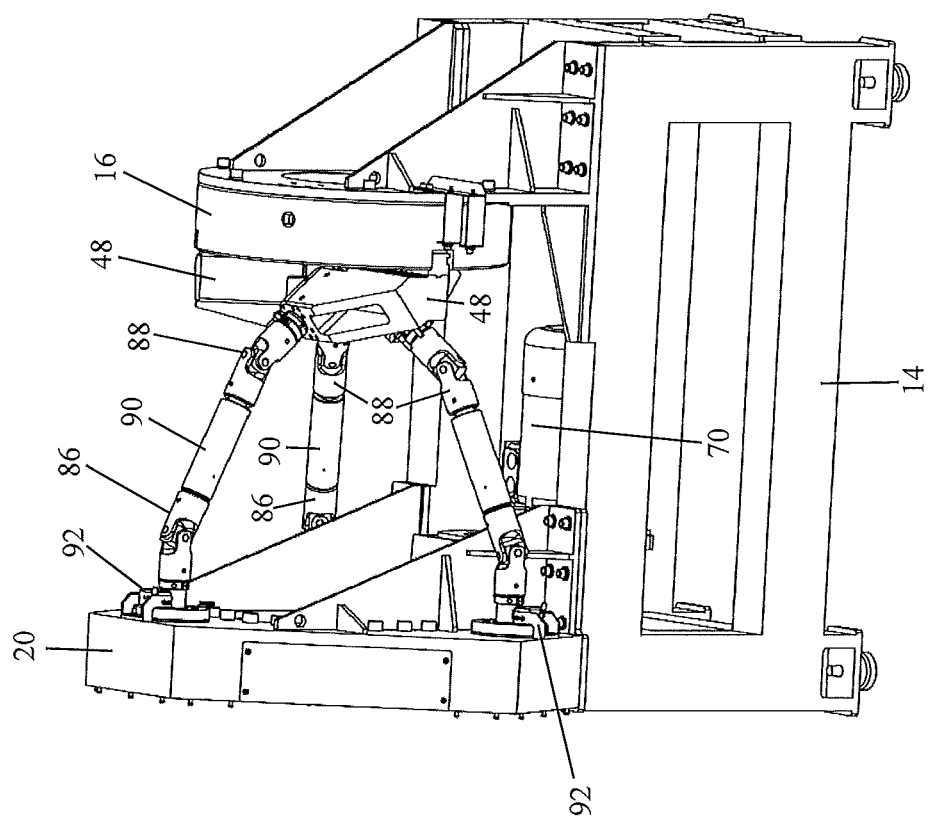
FIG. 4 is an enlarged perspective view similar to FIG. 4 taken from the opposite side of the central forming section.
Figure 6:
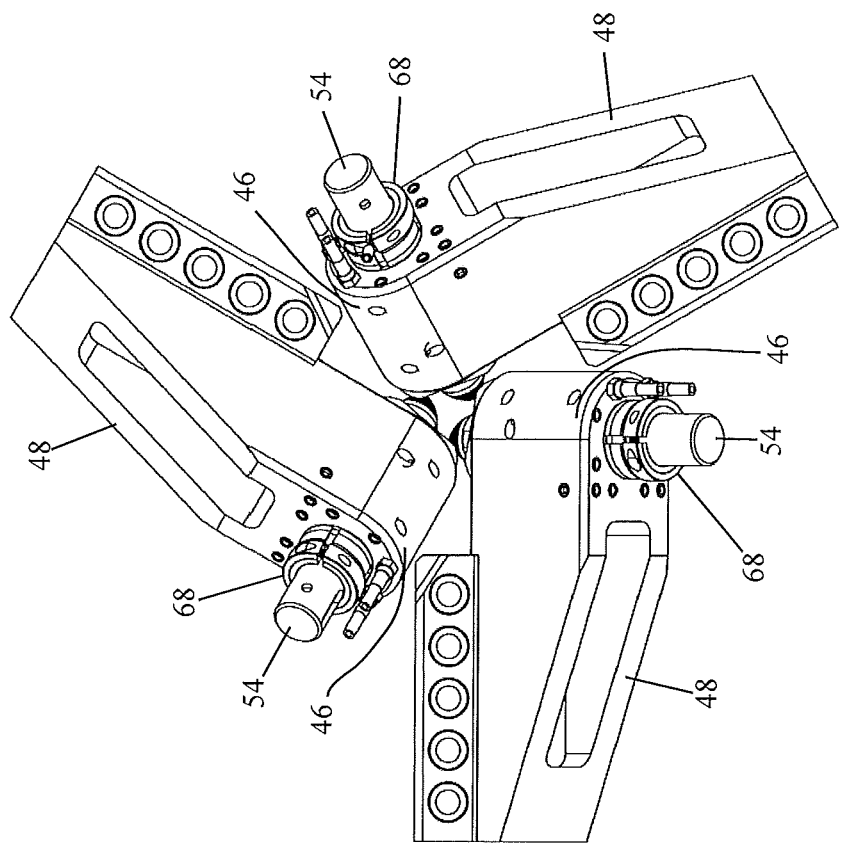
FIGS. 5 and 6 are enlarged perspective views of the three jaw members and their associated forming tools that engage the workpiece during the forming operation.
Figure 5:
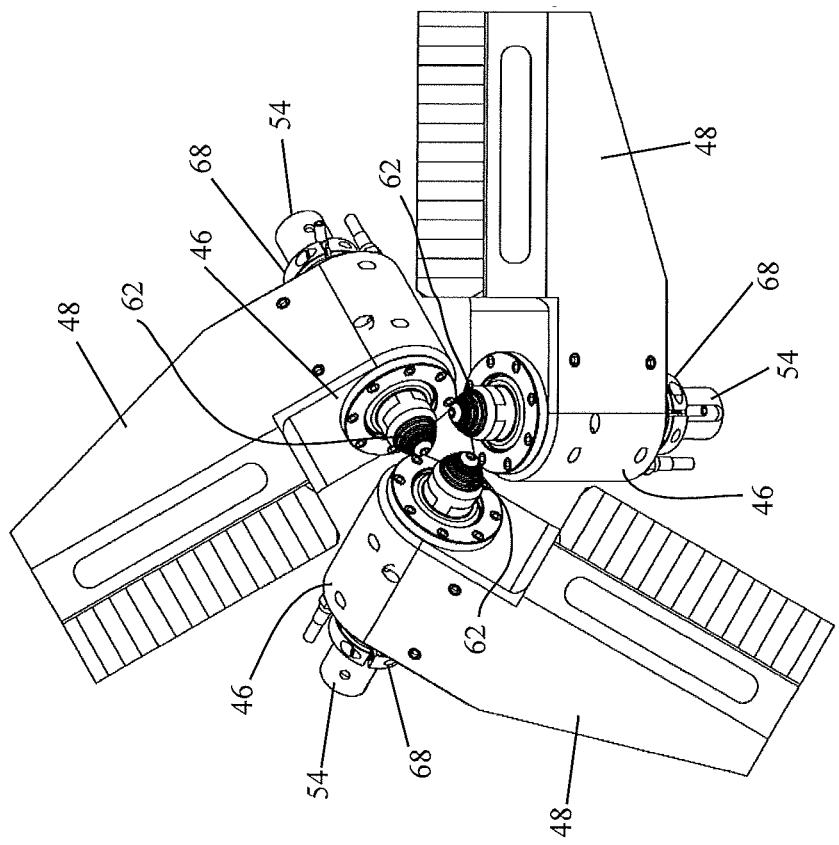
Figure 8:
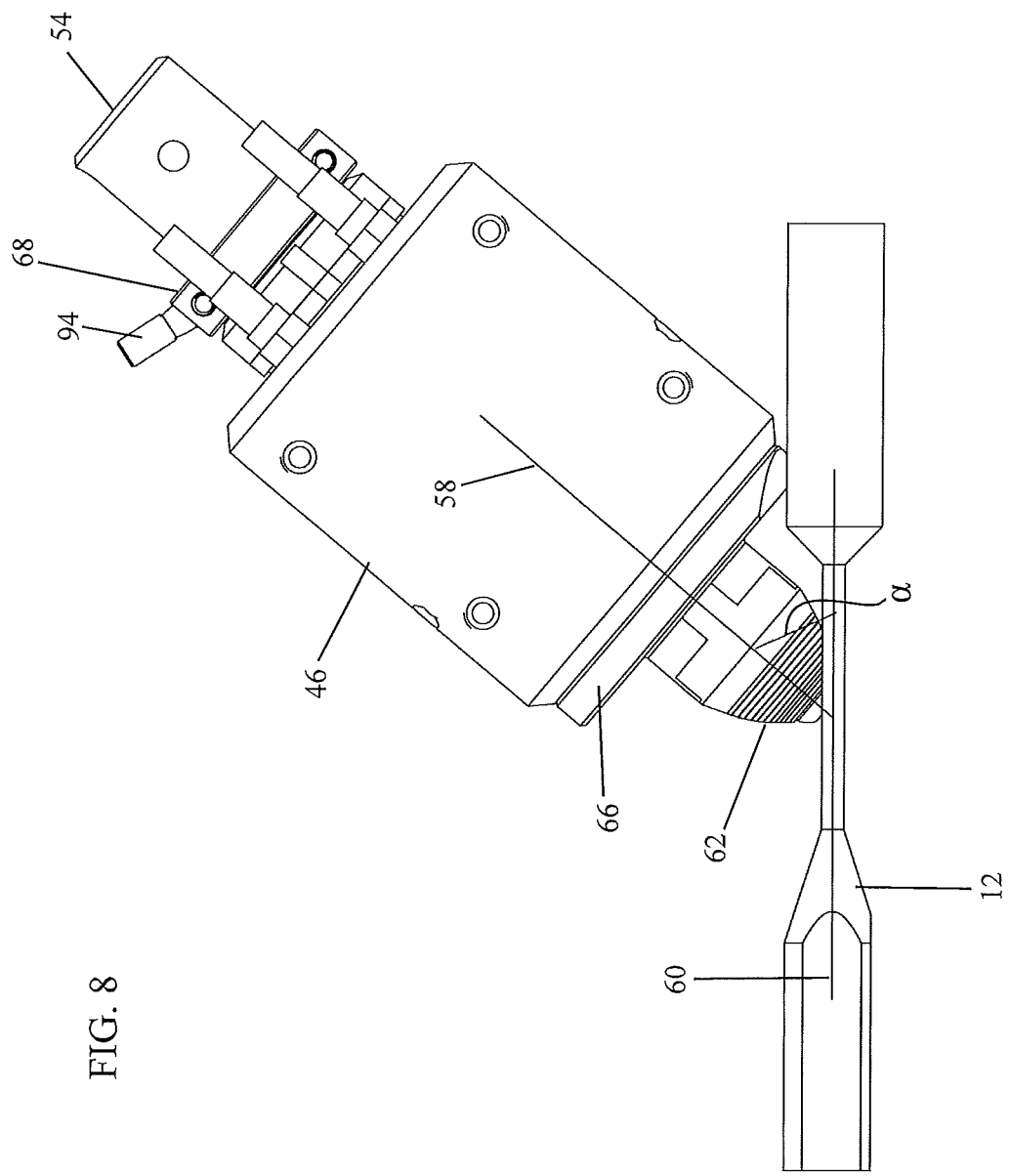
FIG. 8 is a side view of a single jaw member and its associated forming tool engaging the workpiece during a forming operation.

The embodiments disclosed herein are for the purpose of providing an exemplary description of the present subject matter. They are, however, only exemplary, and the present subject matter may be embodied in various forms. Therefore, specific details disclosed herein are not to be interpreted as limiting the subject matter as defined in the accompanying claims.

With reference to the drawings, a rolling mill, generally designated 10, is shown that provides for the incremental rotary shaping of an elongated workpiece 12. The workpiece 12 may be either a length of tubular stock, or round bar stock. In general terms, the rolling mill 10 comprises a main support frame 14 to which are mounted a radial chuck 16 to which workpiece-engaging tools 18 are secured and a gear box 20 for rotating the tools 18. A feed mechanism, generally designated 22 for the workpiece 12 is slidably mounted to a track 24, the track being supported on input and output alignment frames, 26 and 28, respectively, secured to the main support frame 14, to move the workpiece 12 back and forth between the tools 18 mounted in the chuck 16. A programmable controller 30 with an operator input controls the movement of the various components, and also delivers an electrical current to the workpiece through the workpiece-engaging surfaces of the tools.

More specifically, the feed mechanism 22 comprises a pair of workpiece holders 32, 34, slidably received on and movable along the track 24, and each securing one end of the elongated workpiece 12. Preferably, there is no relative linear axial motion between the workpiece 12 and the workpiece holders 32, 34 once the workpiece is mounted therebetween. However, relative rotary motion between the workpiece holders and the workpiece is permitted.

If the workpiece 12 has a tubular configuration, a mandrel 36 is provided that extends between the input and output sides of the system through the interior of the workpiece 12 to maintain its inside diameter. As illustrated, the end of the mandrel on the input side of the system is secured to the input frame 26 by a tail stock 38. Preferably, the tail stock 38 permits the mandrel 36 to freely rotate about its axis. The end of the mandrel 36 on the output side of the system is simply supported on the interior of the tubular workpiece 12. As can be appreciated, the mandrel 36 should have a length sufficient to extend through the workpiece 12 through its entire range of motion along the track.

The workpiece holders 32, 34 are positioned on the track 24 on opposite sides of the radial chuck 16, and are movable back and forth along the track 24 to draw the workpiece 12 through the tools 18 during the forming operation. To this end, a motor 40 is operatively connected to one of the workpiece holders 32, 34. Preferably the motor acts on the workpiece 34 holder located on the output side of the radial chuck 16, so that as the workpiece holder 34 draws the workpiece 12 through the tools 18, the workpiece 12 is under tension, which will help to minimize any ridges formed in the workpiece 12. By way of example, the track 24 and workpiece 32, 34 holders provide for a range of travel along the track 24 of up to approximately 1.3 m to 1.7 m, at a speed of up ac to approximately 125 mm/s and with an input thrust force of up to 6029 N.

As illustrated, each of the workpiece holders 32, 34 also includes a conductive terminal 42, 44, respectively, preferably made of graphite, for conducting electrical current through the workpiece holders 32, 34 to/from the workpiece 12 through a selected one of the graphite terminals 42, 44, as will be described in greater detail below.

As noted above, the workpiece-engaging tools 18 are mounted to the chuck 16. More specifically the workpiece-engaging tools 18 are rotatably mounted in bearing housings 46 secured to the jaws 48 of the chuck 16. This permits the tools 18 to be movable by the chuck 16 radially with respect to the longitudinal axis of the workpiece 12 by a motor 50 associated with the chuck 16, so that the tools 18 may be brought into engagement with the workpiece 12 during a forming pass, and moved out of contact with the workpiece 12 during a return pass. As illustrated, the chuck 16 includes three jaws 48, each having a tool 18 associated therewith. However, a chuck 16 having four or more jaws 48/tools 18 may be utilized. By way of example, the motor 50 associated with the chuck may achieve a torque of 102 Nm and a rotational speed for the chuck 16 of 0.625 rps. The three jaws 48 together can achieve an active clamping force of 20 kN and a rolling radial force of 66 kN.

Each bearing housing comprises 46 a sleeve member 52 that receives the shaft 54 of its associated tool 18, the sleeve 52 including a plurality of bearings 56 to facilitate rotation of the tool 18 relative to its housing 46. The tools 18 are mounted in their respective bearing housings 46 so that the axis of rotation 58 of the tool 18 forms a skew angle α relative to the longitudinal axis 60 of the workpiece 12. In the illustrated system, the skew angle α is 50°, as measured in a plane defined by the intersection of the longitudinal axis of the workpiece 60 and the axis of rotation 58 of each of the tools 18. However, the skew angle α may vary, typically from 30° to 60°, depending on the final diameter of the workpiece 12, the shape of the workpiece engaging surface 62 of the tool 18, the physical properties of the workpiece (such as the yield strength and resistivity), and the linear speed of the workpiece in the axial direction.

Preferably, the workpiece-engaging surface 62 of the tool 18 has a convex shape, when viewed in cross-section. The convex shape has a radius of curvature that is determined based on the final diameter of the workpiece 12, the physical properties of the workpiece (such as the yield strength and resistivity), and the linear speed of the workpiece in the axial direction. If the radius of curvature is infinite, the tools 18 assume a conical shape, providing a very large contact area.

The size of the contact area, when a current passes through the tools 18 to the workpiece 12, determines the current density in the workpiece. Higher current densities result in lower amounts of force being applied to the workpiece through the tools. The shape of the contact area is also responsible for the size and shape of any ridges left on the workpiece after forming. A convex shape, for example, results in a smaller contact area, which creates smaller ridges, thus providing a smoother surface. By way of example, for a workpiece engaging surface having a maximum diameter of "X", a typical radius of curvature for the work-contacting region would be approximately 2X.

The workpiece-engaging surface 62 of the tool is preferably removably secured to its shaft 54. This permits a workpiece-engaging surface 62 having the ac desired radius of curvature relative to the workpiece 12 to be selectively mounted to the shaft 54, or to permit a worn workpiece-engaging surface 62 to be replaced. As illustrated, the workpiece-engaging surface 62 is removably secured to its shaft 54 by a screw 64. In addition, the shaft 54 includes a shoulder 66 on the end supporting the workpiece engaging surface 62 for locating the tool 18 within its bearing housing 46. A removable collar 68 is secured to the other end of the shaft 54 exterior of the bearing housing 46 to lock the tool 18 in place. Preferably, shaft 54 and its associated workpiece-engaging surface 62 are electrically conductive, while the collar 68 is non-conductive, so as to permit electrical current to flow through the tool 18 to the workpiece 12, again as will be described in greater detail below.

To rotate the tools 18 within their respective bearing housings 46, a motor 70 and gearbox 20 are provided that are mounted to the main support frame 14, with the gearbox 20 facing the chuck 16. The gearbox 20 comprises a housing 72 to which a slewing ring 74 having external gear teeth 76 is mounted for rotation. The motor 70 includes a rotatable shaft 78 that carries a pinion gear 80 that meshes with the gear teeth 76 of the slewing ring 74 to impart rotational motion thereto. A stub shaft 82 for each tool 18 is also rotatably mounted within the housing 72, with each stub shaft 82 having a pinion gear 84 that engages the gear teeth 76 of the slewing ring 74 so that the stub shafts 82 are rotated upon rotation of the slewing ring 74 by the motor 70. Universal joints 86, 88 are mounted to each stub shaft 82 and to the shaft 54 of each tool 18, with a driven shaft 90 connecting the universal joint 88 associated with each tool 18 to the universal joint 86 of its respective stub shaft 82. Thus, rotation of the stub shafts 82 will impart rotation to the tools 18 through the associated universal joints 86, ac 88 and driven shaft 90. By way of example, the motor 70/slewing ring 74 are capable of proving a torque of up to 620 Nm on each tool 18 at a speed of 29 rpm, and provide an induced linear speed (the axial linear speed of the workpiece when driven only by the friction between the workpiece 12 and the tools 18) of 33 mm/s. The portion of the stub shaft 82 external to the housing is also contacted by a conductive terminal 92, preferably made of graphite, for conducting electrical current through the workpiece, as discussed below.

Figure 9:
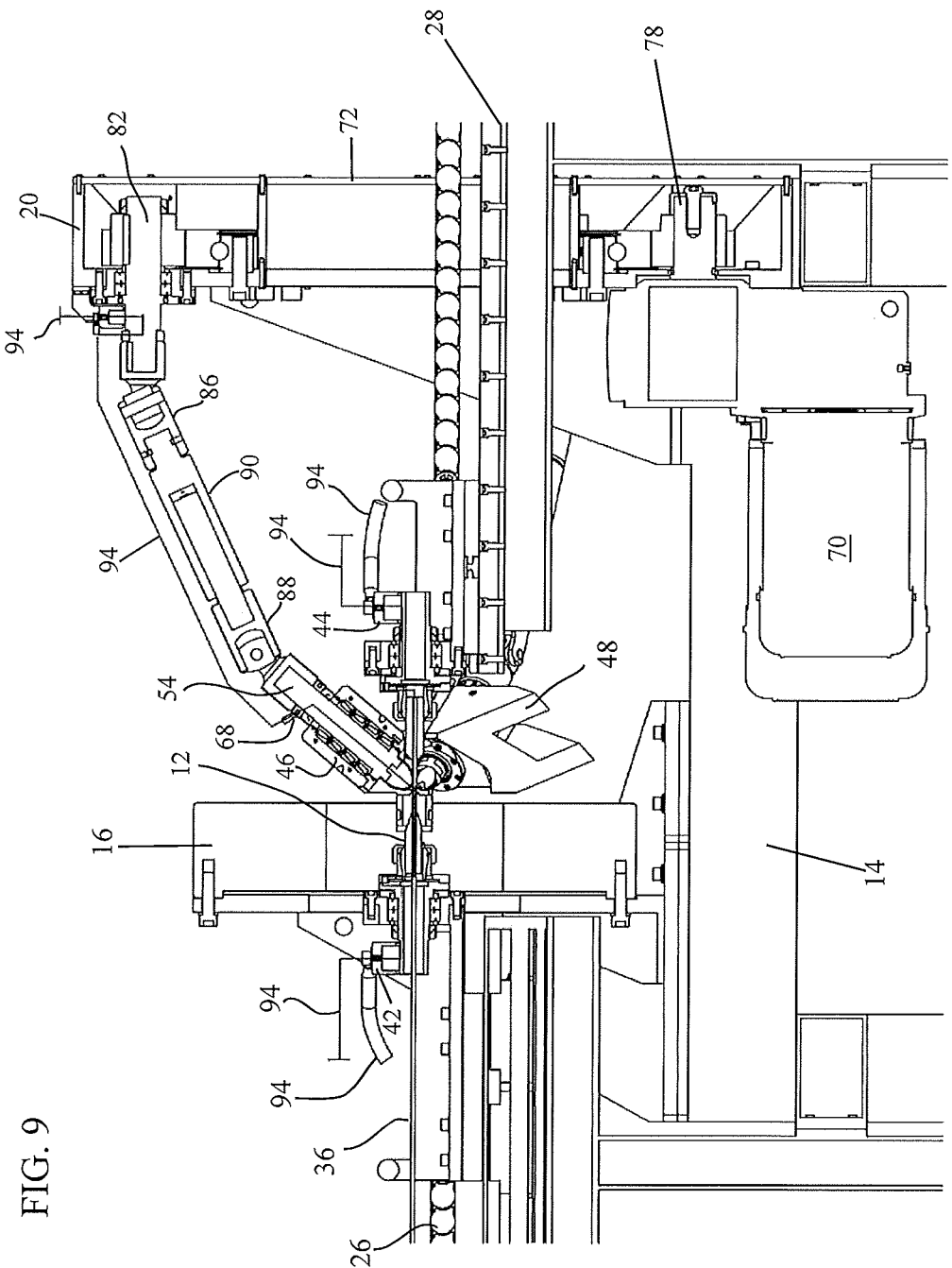
FIG. 9 is an enlarged cross-sectional view of the central forming section of the system, with certain components removed for clarity, and showing a current flow path through the workpiece.

It is desirable to pass an electrical current through the workpiece 12 to facilitate the shaping of the workpiece 12 by softening the workpiece 12. To this end, a source of electrical current is provided by a control console 94 that is conductively connected to each of the tools 18 and to a selected one of the workpiece holders 32, 34 (through, e.g., the graphite terminals 92 associated with each of the stub shafts 82 and either one of the graphite terminals 42, 44 associated with the workpiece holders 32, 34, described above), with the workpiece 12 held between the holders 32, 34 completing the electrical flow path 94. As illustrated in FIG. 9, the current flow path through only one of the tools 18 is shown. However, the current flow path 94 through each of the other two tools 18 would be similar. Alternatively, the current can also be provided by connecting the two ends of the workpiece 12 to the power source through, e.g., the graphite terminals 42, 44 associated with the workpiece holders 32, 34.

The magnitude of the current density is dependent upon the material that is being shaped. See, Magaree, Fan and Cao, "Analysis and Observations of Current Density Sensitivity and Thermally Activated Mechanical Behavior in Electrically-Assisted Deformation," ASME J. of Manufacturing Science and Engineering, December, 2013, Vol. 135. By way of example, a preferred current density ac is 30 to 70 $A/mm^2$ for stainless steel 304, or 15-30 $A/mm^2$ for Ti 6Al4V.

Preferably, the control console 96 also comprises the programmable controller 30 with an operator input that will automatically control the operation of the three motors 40, 50, 70 to bring the tools 18 into or out of engagement with the workpiece 12, rotate the tools 18, move the workpiece 12 back and forth between the tools 18 in a forming pass and a return pass, and flow electrical current through the workpiece 12. Preferably, the controller permits 30 individual control of the current delivered to each tool 18. More preferably, upon input to the controller 30 by the operator of identifying information as to the material characteristics of the workpiece 12 and its geometrical configuration, the controller 30 will automatically determine the speed of feed, number of forming passes, the radial spacing of the tools 18, and the amount of current delivered to each tool 18, and automatically operate the system in accordance with such determinations.

Thus, with a system 10 as described above, a workpiece 12 may be incrementally formed by: a) mounting the workpiece 12 to the first and second workpiece holders 32, 34; b) moving the jaws 48 of the chuck 16 radially inwardly to bring the workpiece engaging surfaces 62 of the tools 18 into contact with the workpiece 12; c) rotating the tools 18; d) moving the workpiece 12 relative to the tools 18 in a forming pass from a first position to a second position; e) moving the jaws 48 of the chuck 16 radially outwardly to move the workpiece engaging surfaces 62 of the tools 18 away from contact with the workpiece 12; f) moving the workpiece 12 relative to the tools in a return pass from the second position to the first position; and g) repeating steps b) f), as needed, to achieve the desired shape for the workpiece 12. As noted above, the forming method also includes ac flowing current through the tools 18 to the workpiece 12 as the workpiece 12 moves in the forming pass from the first position to the second position.

If the workpiece has a tubular configuration, the method may also include mounting an elongated mandrel 36 to the support frame 26 so that the mandrel 36 extends through the workpiece 12 and the first and second workpiece holders 32, 34 during movement of the workpiece 12 between the first and second positions.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description, but is set forth in the following claims.

The invention claimed is:

1. A rolling mill system for incremental rotary shaping of an elongated workpiece having first and second ends and having a longitudinal axis extending therebetween, the system comprising:
   a) a first workpiece holder configured to secure the first end of a workpiece thereto;
   b) a second workpiece holder configured to secure the second end of the workpiece thereto so that the longitudinal axis of the workpiece extends between the first and second workpiece holders;

c) a support frame having an input end and an output end and supporting a track, the first and second workpiece holders being movably associated with the track;

d) a first motor mounted to the support frame and operatively connected to one of the first and second workpiece holders for moving the first and second workpiece holders and an associated workpiece in unison along the track between the input end and the output end of the support frame;

e) a chuck mounted to the frame having a plurality of jaws movable radially inward and outward relative to the longitudinal axis of the workpiece, each jaw having a tool mounted thereto rotatable about an axis of rotation, the axis of rotation of each tool being oriented at a skew angle relative to the longitudinal axis of a workpiece mounted between the first and second workpiece holders;

f) a second motor associated with the chuck and operatively connected to the jaws for simultaneously moving the jaws toward or away from the longitudinal axis of a workpiece;

g) a third motor operatively connected to each tool for simultaneously rotating each tool relative to its associated jaw;

h) a source of electric current and an electrically conductive flow path connected to each of the tools and the first workpiece holder for flowing electrical current through a workpiece mounted between the first and second workpiece holders; and i) a controller configured to control the operation of each of the first motor, second motor and third motor, and to control the flow of current flowing through the tools to a workpiece; and wherein the third motor is operatively connected to each of the tools by a slewing ring rotatably mounted in a housing secured to the support frame, the slewing ring having gear teeth and the motor having a shaft with a pinion gear mounted thereto in engagement with the teeth of the slewing ring for rotation of the slewing ring, a rotatable stub shaft associated for each tool mounted in the housing, each stub shaft having a pinion gear mounted thereto engaging the gear teeth of the slewing ring, and a drive shaft extending between each tool and one of the stub shafts.

2. The system of claim 1 wherein each tool comprises a workpiece-engaging surface having a convex shape.

3. The system of claim 2 wherein the workpiece-engaging surface is removably secured to its associated tool.

4. The system of claim 1 further comprising an elongated mandrel having a first end rotatably mounted to the frame adjacent the input end, the mandrel being sized in diameter to be received within a tubular workpiece and sized in length to extend through the workpiece during movement of the workpiece between the input end and the output end of the system.

5. The system of claim 1 wherein the controller is configured to individually control the current to each of the tools.

6. The system of claim 1 wherein the controller includes an operator input for identifying material characteristics and geometrical configuration of the workpiece, and the controller automatically operates the motors and controls the current flow through the workpiece based on the input.

7. A method for incremental rotary shaping of an elongated workpiece having first and second ends and having a longitudinal axis extending therebetween with the system of claim 1 comprising: a) mounting the workpiece to the first and second workpiece holders b) moving the jaws of the chuck radially inwardly to bring the workpiece engaging surfaces of the tools into contact with the workpiece; c) rotating each of the tools through a single motor; d) moving the workpiece relative to the tools in a forming pass from a first position to a second position; e) moving the jaws of the chuck radially outwardly to move the workpiece engaging surfaces of the tools away from contact with the workpiece; f) moving the workpiece relative to the tools in a return pass from the second position to the first position; and g) repeating steps b)-f), as needed, to achieve a desired shape for the workpiece.

8. The method of claim 7 further comprising flowing current through the workpiece as the workpiece moves in the forming pass from the first position to the second position.

9. The method of claim 8 further comprising flowing current through the tools to the workpiece as the workpiece moves in the forming pass from the first position to the second position.

10. The method of claim 8 further comprising flowing current through the workpiece from the first end of the workpiece to the second end of the workpiece as the workpiece moves in the forming pass from the first position to the second position.

11. The method of claim 9 further comprising before step a), mounting an elongated mandrel to the support frame so that the mandrel extends through the workpiece and the first and second workpiece holders during movement of the workpiece between the first and second positions.

12. The method of claim 9 wherein the workpiece is placed under tension as it moves from the first position to the second position.

13. The method of claim 9 wherein a required current density is applied through the workpiece dependent upon the material of the workpiece.

14. The system of claim 1 wherein the skew angle between the axis of each tool and the longitudinal axis of the workpiece is from 30° to 60°.

15. The system of claim 2 wherein the workpiece-engaging surface of each tool has a maximum diameter of X and has a radius of curvature of approximately 2X.

16. A rolling mill system for incremental rotary shaping of an elongated workpiece having first and second ends and having a longitudinal axis extending therebetween, the system comprising:

a) a first workpiece holder configured to secure the first end of a workpiece thereto;

b) a second workpiece holder configured to secure the second end of the workpiece thereto so that the longitudinal axis of the workpiece extends between the first and second workpiece holders;

c) a support frame having an input end and an output end and supporting a track, the first and second workpiece holders being movably associated with the track;

d) a first motor mounted to the support frame and operatively connected to one of the first and second workpiece holders for moving the first and second workpiece holders and an associated workpiece in unison along the track between the input end and the output end of the support frame;

e) a chuck mounted to the frame having a plurality of jaws movable radially inward and outward relative to the longitudinal axis of the workpiece, each jaw having a tool mounted thereto rotatable about an axis of rotation, the axis of rotation of each tool being oriented at a skew angle relative to the longitudinal axis of a workpiece mounted between the first and second workpiece holders;

f) a source of electric current and an electrically conductive flow path connected to each of the tools and the first workpiece holder for flowing electrical current through a workpiece mounted between the first and second workpiece holders; and g) a controller configured to control the operation of each of the first motor and to control the flow of current flowing through the tools to a workpiece; and wherein the controller is configured to individually control the current to each of the tools; and wherein each tool comprises a workpiece-engaging surface having a convex shape.

17. The system of claim 16 wherein the workpiece-engaging surface is removably secured to its associated tool.

18. The system of claim 17 further comprising a second motor associated with the chuck and operatively connected to the jaws for simultaneously moving the jaws toward or away from the longitudinal axis of a workpiece.

19. The system of claim 17 further comprising a third motor operatively connected to each tool for simultaneously rotating each tool relative to its associated jaw.

20. The system of claim 17 wherein the workpiece-engaging surface of each tool has a maximum diameter of X and has a radius of curvature of approximately 2X.

\* \* \* \* \*